United States Patent
Chen et al.

(10) Patent No.: US 11,068,964 B2
(45) Date of Patent: Jul. 20, 2021

(54) METHOD AND DEVICE FOR PROCESSING SERVICE REQUEST

(71) Applicant: TENCENT TECHNOLOGY (SHENZHEN) COMPANY LIMITED, Shenzhen (CN)

(72) Inventors: Yang Chen, Shenzhen (CN); Qingdong Yin, Shenzhen (CN); Jianming Yao, Shenzhen (CN); Jinshan Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 835 days.

(21) Appl. No.: 15/191,891

(22) Filed: Jun. 24, 2016

(65) Prior Publication Data

US 2016/0307264 A1    Oct. 20, 2016

Related U.S. Application Data

(63) Continuation of application No. PCT/CN2014/096041, filed on Dec. 31, 2014.

(30) Foreign Application Priority Data

Jan. 3, 2014   (CN) .......................... 201410004223.5

(51) Int. Cl.
*G06Q 30/06*   (2012.01)
*H04L 29/14*   (2006.01)
(Continued)

(52) U.S. Cl.
CPC ......... *G06Q 30/0635* (2013.01); *G06Q 20/12* (2013.01); *G06Q 20/14* (2013.01);
(Continued)

(58) Field of Classification Search
CPC ..................................... G06Q 30/06
(Continued)

(56) References Cited

U.S. PATENT DOCUMENTS

| | | | |
|---|---|---|---|
| 8,738,770 B2 * | 5/2014 | Kumarjiguda | .... H04L 29/08099 709/219 |
| 2008/0062863 A1 | 3/2008 | Ginde | |

(Continued)

FOREIGN PATENT DOCUMENTS

| | | |
|---|---|---|
| CN | 1859795 A | 11/2006 |
| CN | 101060474 A | 10/2007 |

(Continued)

OTHER PUBLICATIONS

Kumar Shrivastava, S., & Banatre, J. (1978). Reliable resource allocation between unreliable processes. IEEE Transactions on Software Engineering, 4(3), 230-241. doi:http://dx.doi.org/10.1109/TSE.1978.231500.*

(Continued)

*Primary Examiner* — Jeffrey A. Smith
*Assistant Examiner* — Jennifer V Lee
(74) *Attorney, Agent, or Firm* — Anova Law Group, PLLC

(57) ABSTRACT

A method for processing a service request is provided, which includes: assigning, by a server, an identifier to a service request; if processing of a first service times out, marking a processing state as a first processing state, if the processing does not time out and the processing succeeds, continuously processing the second service, and if the processing times out, marking the processing state as a second processing state; and querying for the processing state of the service request according to the identifier regularly, acquiring a processing result of the service request, and sending the processing result to the user terminal, the processing result (Continued)

including a first processing result corresponding to the first service and a second processing result corresponding to the second service, where when it is queried that the second processing result is unsuccessful, an identifier is reassigned to the service request.

18 Claims, 17 Drawing Sheets

(51) Int. Cl.
    *G06Q 20/14*     (2012.01)
    *G06Q 40/02*     (2012.01)
    *G06Q 30/04*     (2012.01)
    *G06Q 20/12*     (2012.01)

(52) U.S. Cl.
    CPC ............. *G06Q 30/04* (2013.01); *G06Q 30/06* (2013.01); *G06Q 40/02* (2013.01); *H04L 69/40* (2013.01)

(58) Field of Classification Search
    USPC .............................................. 705/26.1–27.2
    See application file for complete search history.

(56) References Cited

U.S. PATENT DOCUMENTS

2010/0122136 A1     5/2010   Korndewal et al.
2015/0302377 A1*   10/2015   Sweitzer ............... G06F 3/0484
                                                                                                  705/17

FOREIGN PATENT DOCUMENTS

CN           101132401 A     2/2008
CN           101286980 A     10/2008
CN           101720074 A     6/2010

OTHER PUBLICATIONS

The World Intellectual Property Organization (WIPO) International Search Report for PCT/CN2014/096041 dated Apr. 13, 2015.
The State Intellectual Property Office of the People's Republic of China (SIPO) Office Action 1 for 201410004223.5 dated Aug. 17, 2017 pp. 1-8.

* cited by examiner

METHOD AND DEVICE FOR PROCESSING SERVICE REQUEST

CROSS REFERENCE TO RELATED APPLICATIONS

This application is a continuation application of PCT application PCT/CN2014/096041, filed on Dec. 31, 2014, which claims priority to Chinese Patent Application Serial No. 201410004223.5, entitled "Method and Device for Processing Service Request," filed on Jan. 3, 2014, the content of both of which is incorporated herein by reference in its entirety.

FIELD OF THE INVENTION

The present disclosure relates to computer communication technologies and, in particular, to a method and device for processing a service request.

BACKGROUND OF THE INVENTION

With the development of computer and network communication technologies, internet service providers may, by using servers, provide users with various services, for example, e-commerce, games, social networks and the like. These various services are usually associated with each other, especially some services that can be obtained only after payment. For example, a lottery service to be paid requires a server to simultaneously process two services, namely, payment and lottery. In the prior art, when a server processes a plurality of services associated with each other, if processing timeout occurs: if the timeout occurs in a service having a prior processing order, a user is notified that the processing fails and a subsequent service is no longer continuously processed; and if the timeout occurs in a service having a later processing order, the service where the processing timeout occurs is reprocessed regularly.

However, processing timeout does not mean processing failure and it is possible that a processing result is successful. On the one hand, if the situation where the timeout occurs but the processing actually succeeds occurs in a service stage having a prior processing order, the practice of the prior art may cause a misjudgment on the processing situation of the overall service, thus making it impossible to obtain a processing result, especially a service premised on payment, because an electronic payment service is irreversible. Once deduction succeeds, economic losses will be caused to a user when a subsequent service is not processed due to payment timeout. On the other hand, if the situation where timeout occurs but the processing actually succeeds occurs in a service stage having a later processing order, repeated processing may be caused, thereby leading to a waste of system resources, especially for some services that can be obtained only after payment, and losses will be caused to internet service providers due to the repeated processing. Therefore, the existing processing technique can be inefficient.

SUMMARY

In view of the above, the present disclosure provides a method and device processing a service request, which can improve processing efficiency.

A method for processing a service request, includes: receiving, by a server, a service request sent by a user terminal and assigning a unique identifier to the service request, where the service request is used for acquiring preset first and second services and a processing order of the first service is prior to that of the second service; processing the first service, if the processing times out, marking a processing state of the service request as a first processing state, if the processing does not time out and the processing succeeds, continuously processing the second service, and if the processing of the second service times out, marking the processing state of the service request as a second processing state; and querying for the processing state of the service request according to the identifier regularly, acquiring a processing result of the service request, and sending the processing result to the user terminal, the processing result including: a first processing result corresponding to the first service and a second processing result corresponding to the second service, where when it is queried that the second processing result is unsuccessful, an identifier is reassigned to the service request.

A device for processing a service request, run in a server, includes: an assignment module, configured to receive a service request sent by a user terminal and assign a unique identifier to the service request, where the service request is used for acquiring preset first and second services and a processing order of the first service is prior to that of the second service; a service processing and marking module, configured to: process the first service, if the processing times out, mark a processing state of the service request as a first processing state, if the processing does not time out and the processing succeeds, continuously process the second service, and if the processing of the second service times out, mark the processing state of the service request as a second processing state; and a processing result acquisition module, configured to query for the processing state of the service request according to the identifier regularly, acquire a processing result of the service request, and send the processing result to the user terminal, the processing result including: a first processing result corresponding to the first service and a second processing result corresponding to the second service, where when it is queried that the second processing result is unsuccessful, an identifier is reassigned to the service request.

According to the method and device for processing a service request provided in the embodiments of the present invention, the server assigns a unique identifier to a received service request sent by the user terminal, processes a first service and a second service based on a predetermined sequence according to the service request, marks processing states of the first service and the second service according to processing situations, respectively, queries for the processing state of the service request according to the identifier regularly, acquires a processing result of the service request, and when it is queried that a second processing result corresponding to the second service is unsuccessful, reassigns an identifier to the service request; the processing state and the processing result of the service request are queried for by using the identifier and an identifier is reassigned to the service request when it is queried that the second processing result is unsuccessful, which thus can avoid that the server repeatedly processes service requests having the same identifier, improves processing efficiency and avoids a waste of resources.

DESCRIPTION OF EMBODIMENTS

To further illustrate the technical means adopted by the present disclosure and effects thereof, specific implementation modes, structures, features and effects according to the present disclosure are described later in detail with reference to the accompanying drawings and preferred embodiments.

First Embodiment

Figure 1:
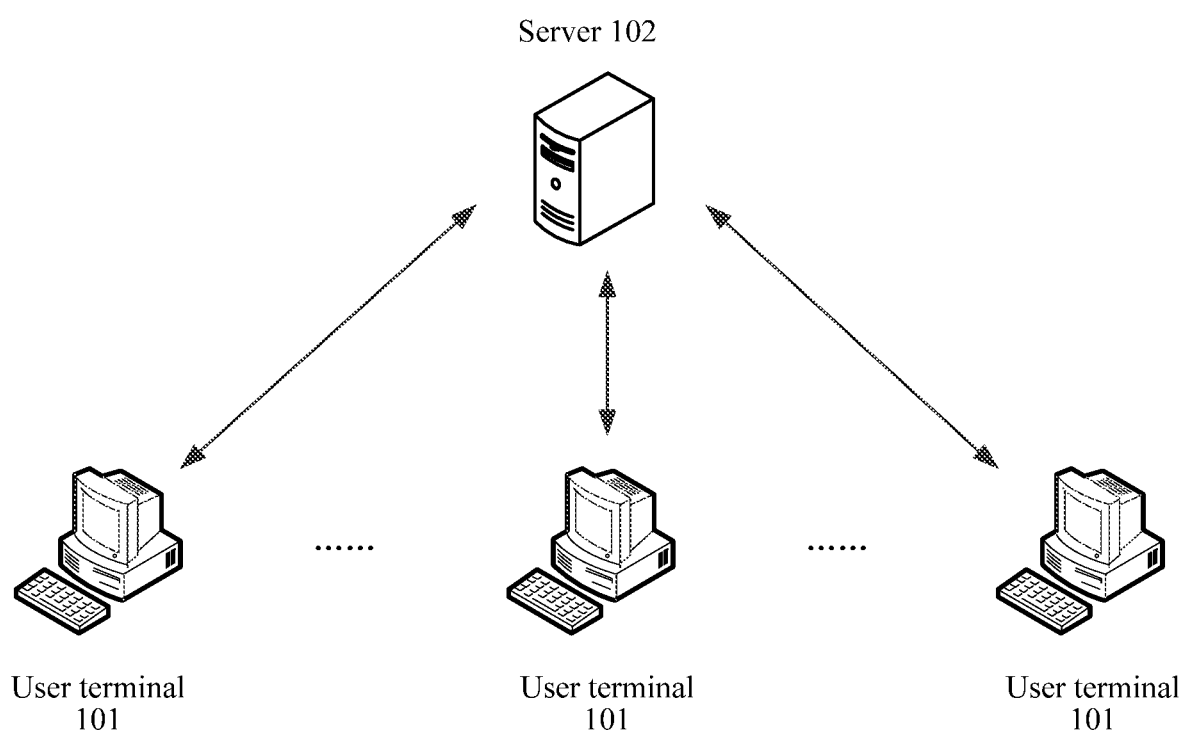
FIG. 1 illustrates an application environment of a method for processing a service request according to a first embodiment of the present invention.

A method for processing a service request according to a first embodiment of the present invention is applicable to an application environment as shown in FIG. 1 and is a method for processing a service request between a user terminal and a server. As shown in FIG. 1, a user terminal 101 and a server 102 are located in a wireless network or a wired network, and the user terminal 101 conducts data interaction with the server 102 by using the wireless network or the wired network. The user terminal 101 may include: a smart phone, a tablet computer, an e-book reader, an MP3 (Moving Picture Experts Group Audio Layer III) player, an MP4 (Moving Picture Experts Group Audio Layer IV) player, a laptop portable computer, a vehicle-mounted computer, a desktop computer and the like.

Figure 2:
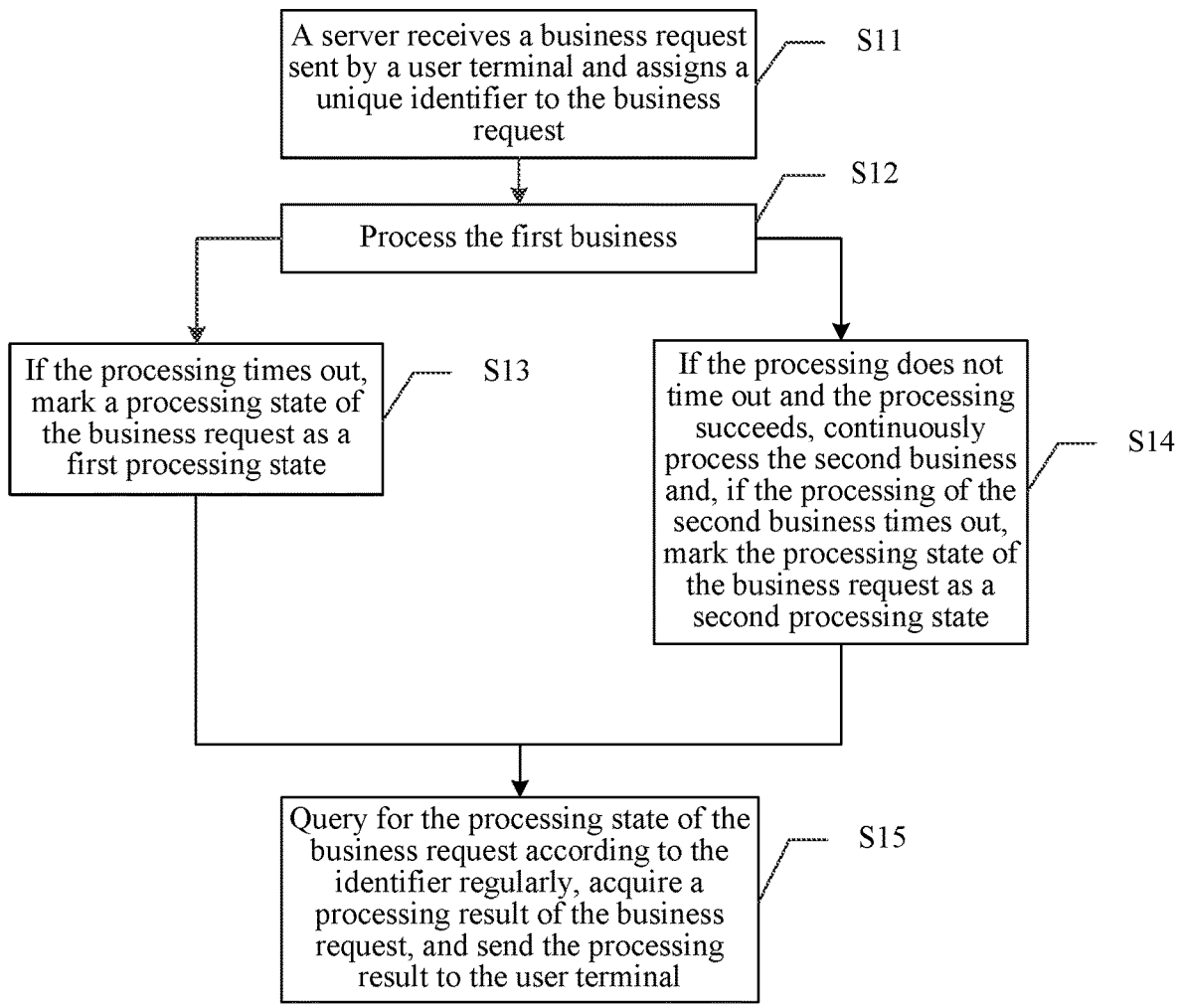
FIG. 2 is a flowchart of the method for processing a service request according to the first embodiment of the present invention.

FIG. 2 is a flowchart of the method for processing a service request according to the first embodiment of the present invention. As shown in FIG. 2, the method for processing a service request in this embodiment includes the following steps:

Step S11: A server receives a service request sent by a user terminal and assigns a unique identifier to the service request.

The service request is used for acquiring preset first and second services, there is a predetermined processing order between the first service and the second service, and according to the predetermined processing order, the processing order of the first service is prior to that of the second service. For instance, the server 102 may receive a service request for paying and drawing a lottery sent by the user terminal 101, and the service request is for acquiring an electronic payment service and a lottery service. According to a predetermined processing order, the server 102 first processes the electronic payment service and continuously processes the lottery service after the electronic payment service is successfully processed. Although the first service and the second service are used, more than two services may be applied.

A unique identifier is used for identifying a service request, i.e., an identity of a service request. The unique identifier at least can be composed of a service code and processing time corresponding to the service request, a user account corresponding to the user terminal, and a preset number of random characters, etc.

Step S12: Processing the first service. That is, according to the predetermined processing order, the service having a higher order is processed based on the unique identifier and other information about the first service.

Step S13: If the processing times out, marking a processing state of the service request as a first processing state.

Specifically, if the processing of the first service times out, that is, if the server 102 does not obtain a processing result of the first service within a preset period, the processing state of the service request is marked as a first processing state. When the processing state of the service request is the first processing state, it indicates that a processing abnormality, for example, processing timeout, occurs in a stage where the server 102 processes the first service corresponding to the service request.

Step S14: If the processing does not time out and the processing succeeds, continuously processing the second service, and if the processing of the second service times out, marking the processing state of the service request as a second processing state.

Specifically, if the server 102 successfully processes the first service and obtains service data within the preset period, the server 102 continuously processes the second service. If the processing of the second service times out within a preset period, that is, if a processing result of the second service is not obtained within the preset period, the server 102 marks the processing state of the service request as a second processing state. When the processing state of the service request is the second processing state, it indicates that a processing abnormality, for example, processing timeout, occurs in a stage where the server 102 processes the second service corresponding to the service request.

Step S15: Querying for the processing state of the service request according to the unique identifier periodically, acquiring a processing result of the service request, and sending the processing result to the user terminal. The processing result includes: a first processing result corresponding to the first service and a second processing result corresponding to the second service. When it is queried that the second processing result is unsuccessful, an identifier is reassigned to the service request.

Specifically, the server 102 queries for the processing state of the service request according to the unique identifier periodically and acquires a processing result of the service request. As stated above, the processing state of the service request may include: the first processing state and the second processing state. The processing result may include: the first processing result obtained by the server 102 during the processing of the first service and the second processing result obtained by the server 102 during the processing of the second service.

Figure 3:
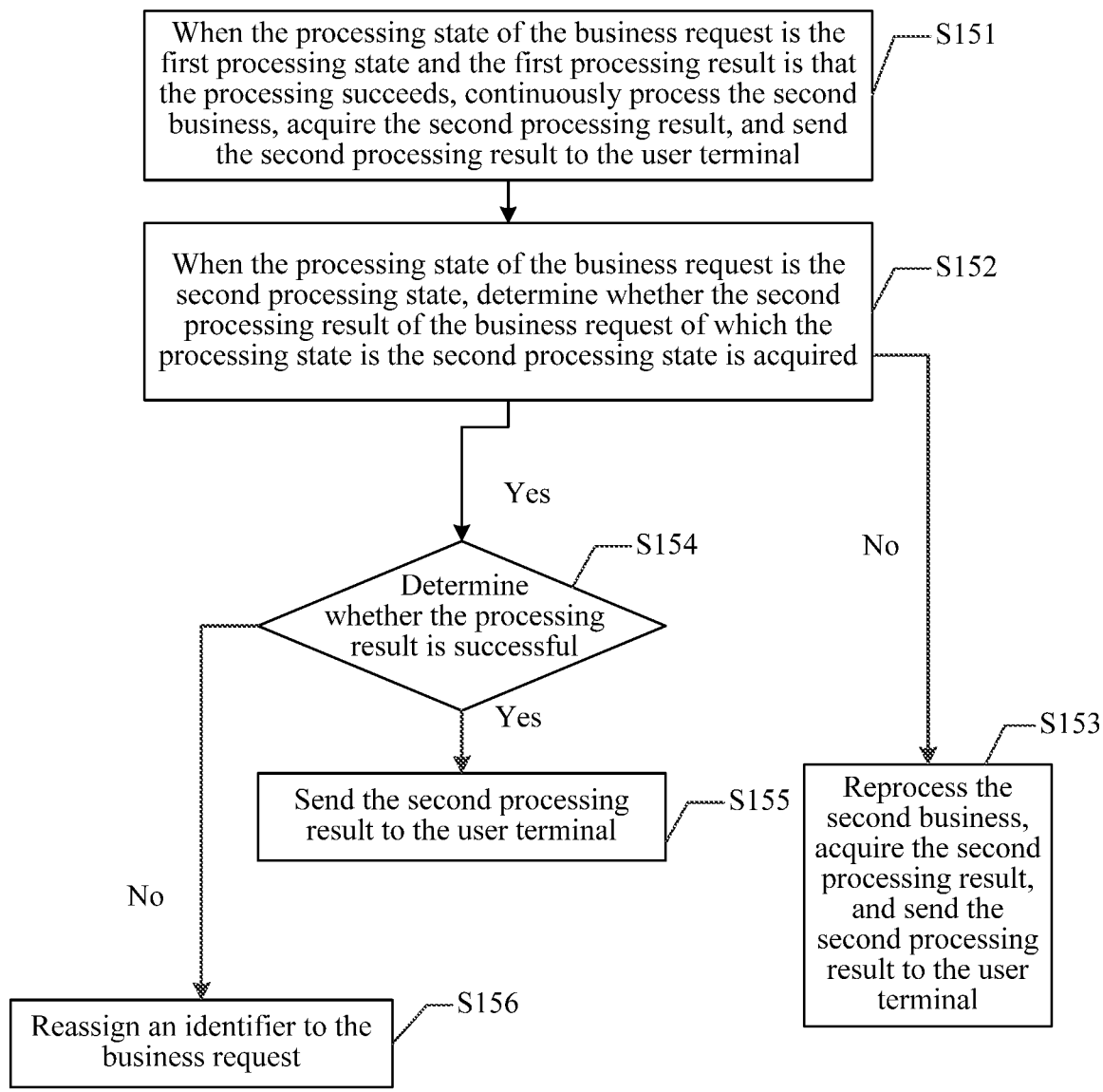
FIG. 3 is a specific flowchart of some steps in the first embodiment of the present invention.

Referring to FIG. 3, step S15 may include:

Step S151: When the processing state of the service request is the first processing state and the first processing result is that the processing succeeds, continuously processing the second service, acquiring the second processing result, and sending the second processing result to the user terminal.

Specifically, when it is queried that the processing state of the service request is the first processing state and the first processing result is that the processing succeeds, that is to say, although the processing timeout occurs when the server 102 processes the first service corresponding to the service request, the server 102 finally succeeds in processing the first service and acquires processing result data, and the server 102 continuously processes the corresponding second service, acquires a processing result of the second service, that is, a second processing result, and then sends the second processing result to the user terminal 101.

Step S152: When the processing state of the service request is the second processing state, determining whether the second processing result of the service request of which the processing state is the second processing state is acquired.

Specifically, when it is queried that the processing state of the service request is the second processing state, whether the second processing result of the service request is acquired is determined, that is, whether the server 102 has processed the second service corresponding to the service request is determined, which can also be understood as determining whether the server 102 stores a processing record of the second service.

If the second processing result is not acquired, performing Step S153: Reprocessing the second service, acquiring the second processing result, and sending the second processing result to the user terminal.

Specifically, if the second processing result is not acquired, the server 102 reprocesses the second service corresponding to the service request, acquires result data of the second processing result (that is, a processing result of the second service), and sends the acquired result data to the user terminal 101. The situation where the processing state of the service request is the second processing state but the server 102 does not acquire the second processing result may occur in a case where: the server 102 fails in processing the second service corresponding to the service request for the first time and then reassigns an identifier to the service request, thereafter the server 102 queries for the processing result of the service request according to the newly-assigned identifier, and the corresponding processing result cannot be acquired by querying according to the newly-assigned identifier due to uniqueness of the identifier.

If the second processing result is acquired, performing Step S154: Determining whether the processing result is successful.

Specifically, if the second processing result is acquired, the server 102 determines whether the second processing result is successful, that is, whether there is corresponding result data.

If the processing result is successful, performing Step S155: Sending the second processing result to the user terminal.

Specifically, if the second processing result is that the processing succeeds, the result data of the second processing result is sent to the user terminal 101.

If the processing result is unsuccessful, performing Step S156: Reassigning an identifier to the service request.

Specifically, if the second processing result is that the processing fails, the server 102 reassigns an identifier to the service request. An identifier needs to be reassigned to the service request which is not successfully processed, because the server 102 can only process the service request having the same identifier once and the processing result will still be unsuccessful if the service request is reprocessed by using the same identifier.

According to the method for processing a service request provided in the embodiment of the present invention, the server assigns a unique identifier to a received service request sent by the user terminal, processes a first service and a second service based on a predetermined sequence according to the service request, marks processing states of the first service and the second service according to processing situations, respectively, queries for the processing state of the service request according to the identifier regularly, acquires a processing result of the service request, and when it is queried that a second processing result corresponding to the second service is unsuccessful, reassigns an identifier to the service request, which thus can avoid that the server repeatedly processes service requests having the same identifier, improves processing efficiency and avoids a waste of resources.

Second Embodiment

Figure 4:
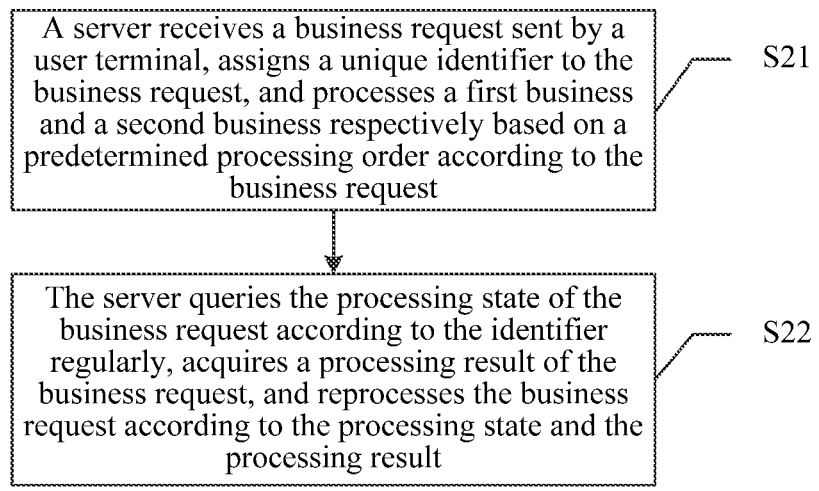
FIG. 4 is a flowchart of a method for processing a service request according to a second embodiment of the present invention.

FIG. 4 is a flowchart of a method for processing a service request according to a second embodiment of the present invention. As shown in FIG. 4, the method for processing a service request in this embodiment includes the following steps:

Step S21: A server receives a service request sent by a user terminal, assigns a unique identifier to the service request, and processes a first service and a second service based on a predetermined processing order according to the service request.

Figure 5:
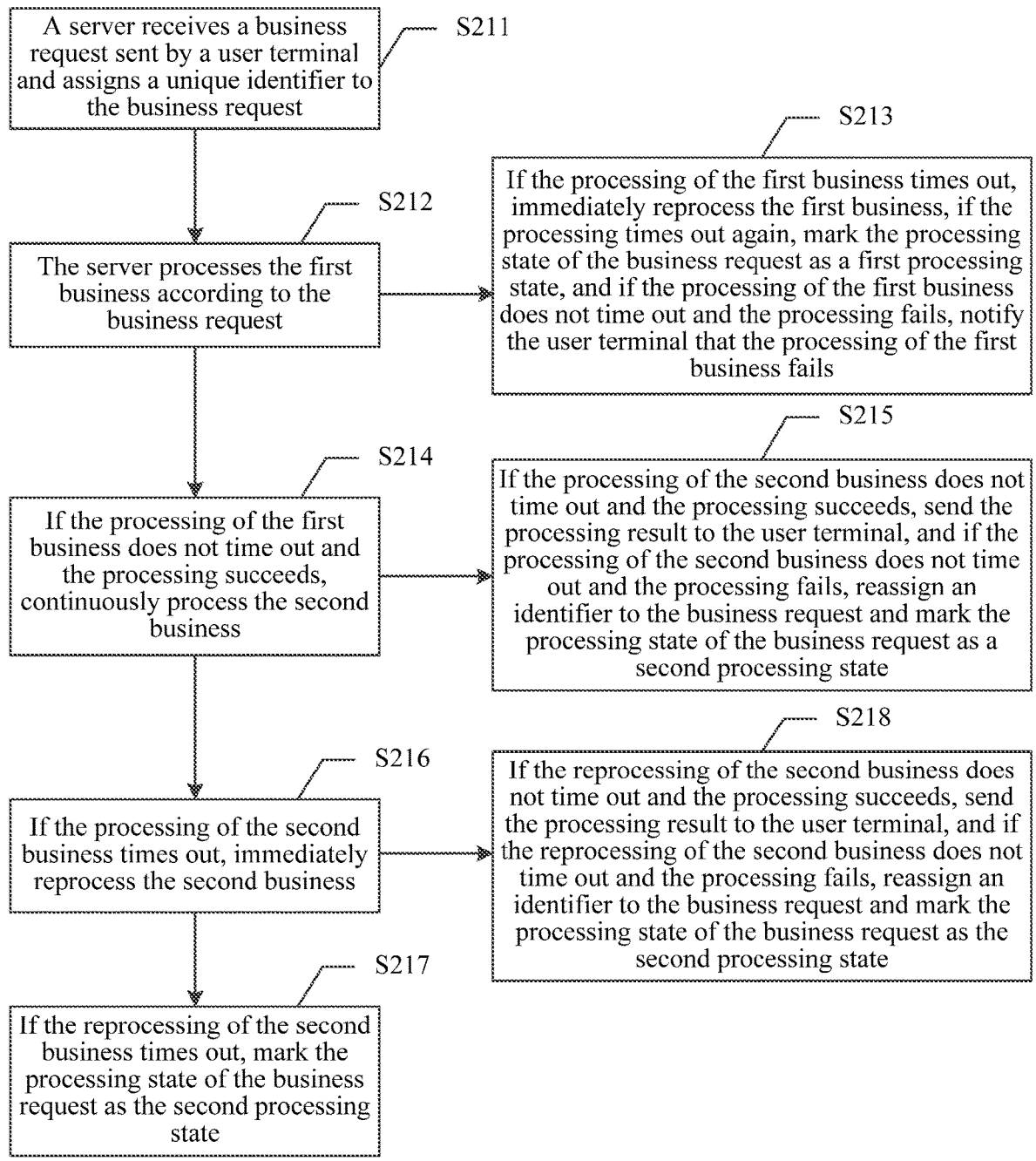
FIG. 5 is a flowchart of details of some steps in the method for processing a service request according to the second embodiment of the present invention.

As shown in FIG. 5, this step specifically includes the following steps:

Step S211: The server receives a service request sent by the user terminal and assigns a unique identifier to the service request.

The service request may include service data used for acquiring preset first and second services, where, according to the predetermined processing order, the processing order of the first service is prior to that of the second service. For example, the service request may be a service request for paying and drawing a lottery, the service request may contain service data used for acquiring an electronic payment service, such as a bank account and a password of a user.

An identifier is used for identifying an identity of a service request. The identifier is unique and can be composed of at least a service code and processing time corresponding to the service request, a user account corresponding to the user terminal, and a preset number of random characters, etc.

Step S212: The server processes the first service according to the service request.

Specifically, the server may process the preset first service according to the service data in the service request by using a first service processing module. It should be understood that the first service processing module not only can be run in the server locally, but also can be run in another cloud server. The first service processing module may record a processing situation upon completion of the processing of the first service, and associates the processing situation with the service request by using the identifier. The server may query for the corresponding processing situation of the first service by using the identifier. The processing situation may specifically include: the processing succeeds and the result data is acquired, and the processing fails and the result data is not acquired.

Step S213: If the processing of the first service times out, immediately reprocessing the first service and, if the processing times out again, marking the processing state of the service request as a first processing state. On the other hand, if the processing of the first service does not time out and the processing fails, notifying the user terminal that the processing of the first service fails.

Specifically, if the processing of the first service times out, that is, beyond a preset period, if the server does not acquire a processing result by using the first service processing module, the server immediately reprocesses the first service by using the first service processing module and, if the processing result is not acquired beyond the preset period, marks the processing state of the service request as a first processing state; and at the same time, the server notifies the user terminal that the processing of the service request is abnormal. A mark of the first processing state may be used for identifying that an abnormality, for example, processing timeout, occurs when the server processes the first service corresponding to the service request. It should be understood that: if the first service processing module is run in another cloud server, a case where the server does not receive processing response data returned by the first service processing module beyond the preset period can be regarded as processing timeout.

If the server fails in processing the first service by using the first service processing module and does not acquire the result data within the preset period, the server notifies the user terminal that the processing of the first service fails.

Step S214: If the processing of the first service does not time out and the processing succeeds, continuously processing the second service.

Specifically, if the server succeeds in processing the first service and acquires processing result data within the preset period, the server may continuously process the second service associated with the first service by using a second service processing module based on the predetermined sequence.

Step S215: If the processing of the second service does not time out and the processing succeeds, sending the processing result to the user terminal, and if the processing of the second service does not time out and the processing fails, reassigning an identifier to the service request and marking the processing state of the service request as a second processing state.

Specifically, if the server succeeds in processing the second service and acquires processing result data within the preset period, the server sends the processing result data to the user terminal.

If the server fails in processing the second service within the preset period, the server reassigns an identifier to the service request and marks the processing state of the service request as the second processing state. A mark of the second processing state may be used for identifying that an abnormality, for example, processing timeout or processing failure, occurs when the server processes the second service corresponding to the service request. It should be understood that the second service processing module not only can be run in the server locally, but also can be run in another cloud server. If the second service processing module is run in another cloud server, a case where the server does not receive processing response data returned by the second service processing module beyond the preset period can be regarded as processing timeout. The second service processing module records a processing situation upon completion of the processing of the second service, and associates the processing situation with the service request by using the identifier. The server may query for the corresponding processing situation of the second service by using the identifier. The processing situation may specifically include: the processing succeeds and the result data is acquired, and the processing fails and the result data is not acquired.

Step S216: If the processing of the second service times out, immediately reprocessing the second service.

Specifically, if the processing of the second service by the server times out, that is, if the processing result of the second service is not acquired beyond the preset period, the server immediately reprocesses the second service by using the second service processing module.

Step S217: If the reprocessing of the second service times out, marking the processing state of the service request as the second processing state.

Specifically, when the server again does not acquire the processing result of the second service beyond the preset period, the server marks the processing state of the service request as the second processing state, and at the same time, notifies the user terminal that the processing of the service request is abnormal.

Step S218: If the reprocessing of the second service does not time out and the processing succeeds, sending the processing result to the user terminal, and if the reprocessing of the second service does not time out and the processing fails, reassigning an identifier to the service request and marking the processing state of the service request as the second processing state.

Specifically, the server again processes the second service by using the second service processing module, and if the processing of the second service succeeds within the preset period, acquires result data indicating that the processing succeeds and sends the acquired result data to the user terminal. If the server fails in processing the second service within the preset period, the server reassigns an identifier to the service request and marks the processing state of the service request as the second processing state.

Step S22: The server queries for the processing state of the service request according to the identifier regularly, acquires a processing result of the service request, and reprocesses the service request according to the processing state and the processing result.

Figure 6:
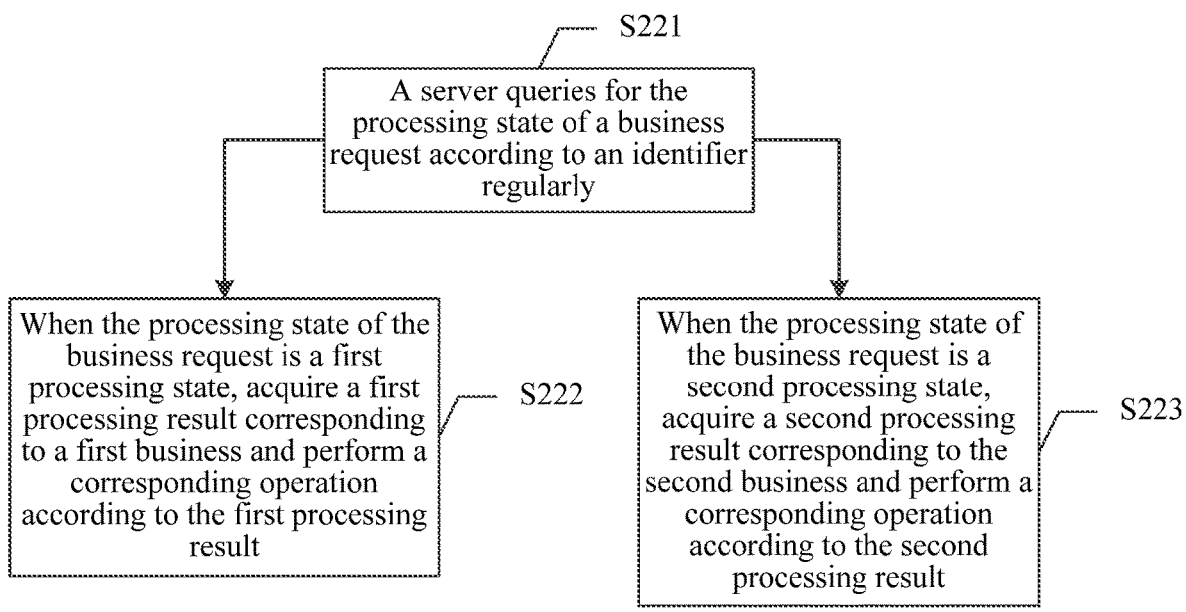
FIG. 6 is a flowchart of details of some steps in the method for processing a service request according to the second embodiment of the present invention.

As shown in FIG. 6, this step specifically includes the following steps:

Step S221: The server queries for the processing state of the service request according to the identifier periodically.

Step S222: When the processing state of the service request is the first processing state, acquiring a first processing result corresponding to the first service and performing a corresponding operation according to the first processing result.

Figure 7:
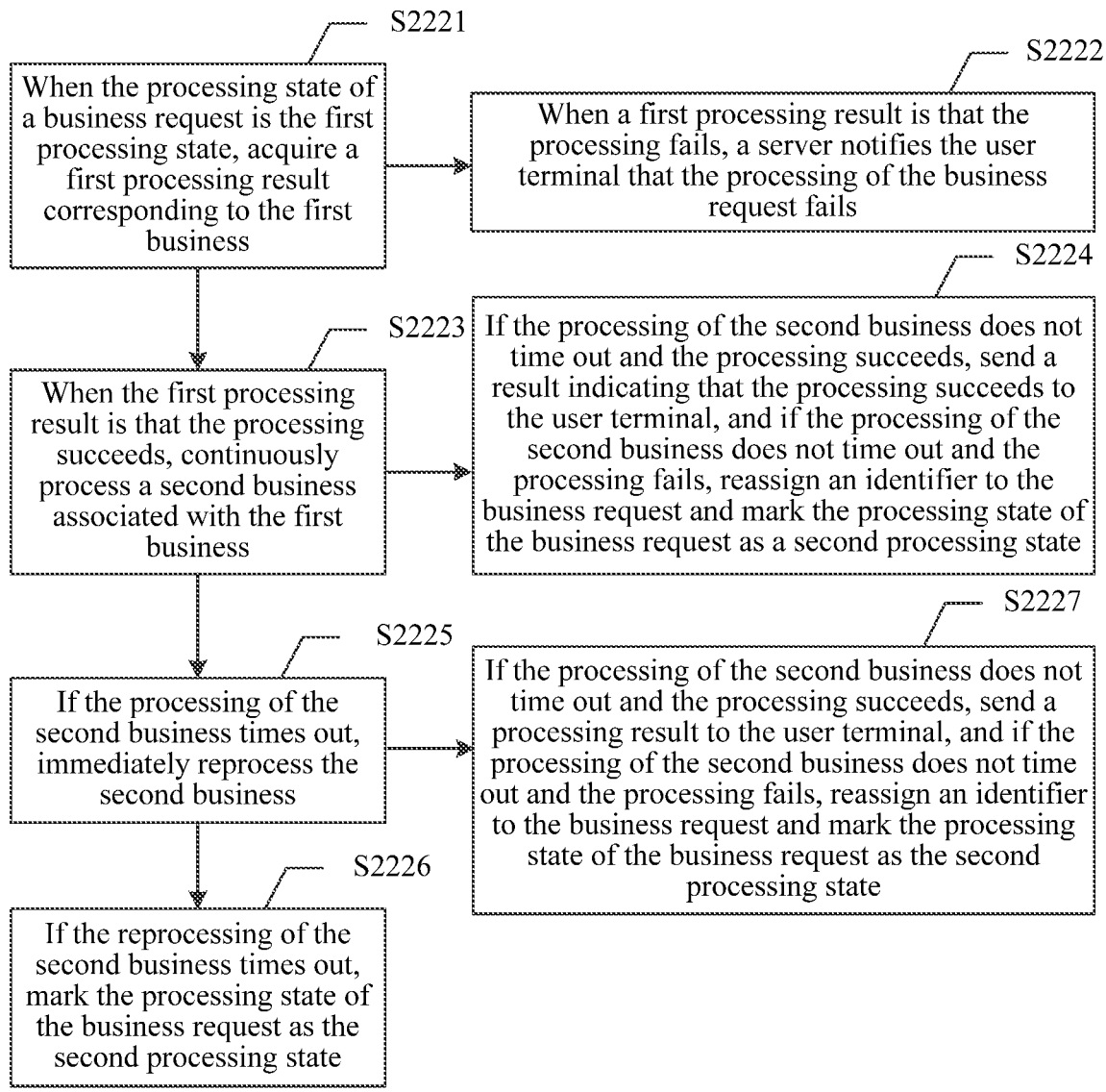
FIG. 7 is a flowchart of details of some steps in the method for processing a service request according to the second embodiment of the present invention.

As shown in FIG. 7, this step specifically includes the following steps:

Step S2221: When the processing state of the service request is the first processing state, acquiring a first processing result corresponding to the first service.

Specifically, when the processing state of the service request is the first processing state, the server acquires a first processing result corresponding to the first service by querying for the record of the first service processing module for the processing situation of the first service according to the identifier.

Step S2222: When the first processing result is that the processing fails, the server notifies the user terminal that the processing of the service request fails.

Step S2223: When the first processing result is that the processing succeeds, continuously processing the second service associated with the first service.

The server acquires, through querying, the first processing result corresponding to the first service according to the identifier and then determines, according to the first processing result, whether to continuously process the second service associated with the first service, which thus can avoid failure of the processing of the service request caused by the situation in the prior art that a subsequent service is not continuously processed after processing timeout occurs in a service having a prior processing order, thereby improving the processing efficiency.

Step S2224: If the processing of the second service does not time out and the processing succeeds, sending a result indicating that the processing succeeds to the user terminal, and if the processing of the second service does not time out and the processing fails, reassigning an identifier to the service request and marking the processing state of the service request as the second processing state.

Step S2225: If the processing of the second service times out, immediately reprocessing the second service.

Step S2226: If the reprocessing of the second service times out, marking the processing state of the service request as the second processing state.

Step S2227: If the reprocessing of the second service does not time out and the processing succeeds, acquiring a result indicating that the processing succeeds, sending acquired result data indicating that the processing succeeds to the user terminal, and if the reprocessing of the second service does not time out and the processing fails, reassigning an identifier to the service request and marking the processing state of the service request as the second processing state.

Reference can be specifically made to Step S213 to Step S218 for step S2222 to step S2226, which are not repeated herein.

Step S223: When the processing state of the service request is the second processing state, acquiring a second processing result corresponding to the second service and performing a corresponding operation according to the second processing result.

Figure 8:
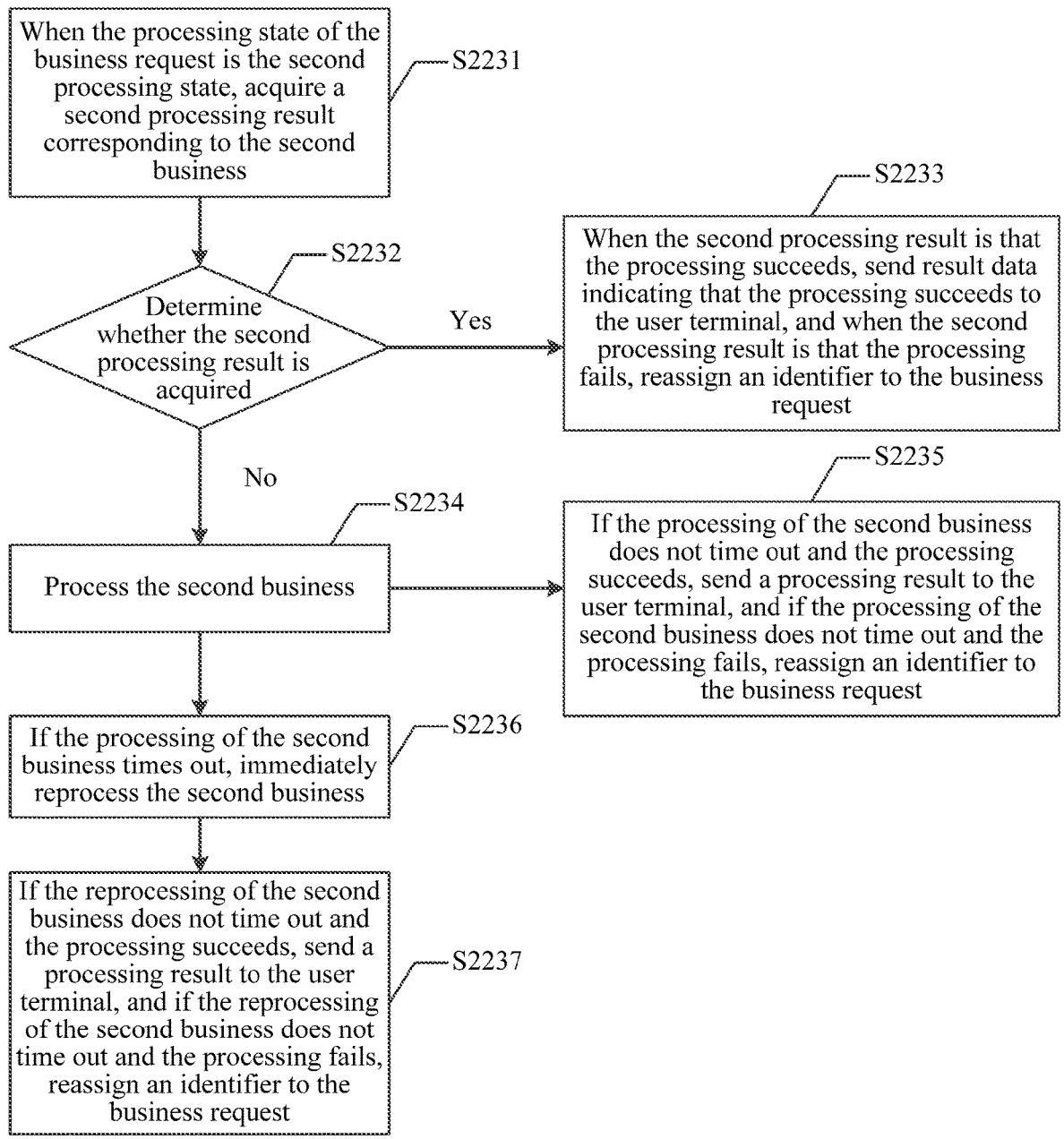
FIG. 8 is a flowchart of details of some steps in the method for processing a service request according to the second embodiment of the present invention.

As shown in FIG. 8, this step specifically includes the following steps:

Step S2231: When the processing state of the service request is the second processing state, acquire a second processing result corresponding to the second service.

Specifically, when the processing state of the service request is the second processing state, the server acquires a second processing result corresponding to the second service by querying for the record of the second service processing module for the processing situation of the second service according to the identifier.

Step S2232: Determining whether the second processing result is acquired.

If the second processing result is acquired, performing Step S2233: When the second processing result is that the processing succeeds, sending result data indicating that the processing succeeds to the user terminal, and when the second processing result is that the processing fails, reassigning an identifier to the service request.

The server acquires, through querying, the second processing result corresponding to the second service according to the identifier and directly sends result data indicating that the processing succeeds to the user terminal when the second processing result is that the processing succeeds, which thus can avoid repeatedly processing a service which has been successfully processed actually, thereby avoiding a waste of system resources, shortening the processing time and improving the processing efficiency.

If the second processing result is not acquired, performing Step S2234: Processing the second service.

Specifically, if the server does not acquire the second processing result, that is to say, if the server does not have a processing record of the second service processing module for the second service corresponding to the identifier, the server processes the second service by using the second service processing module.

Step S2235: If the processing of the second service does not time out and the processing succeeds, sending a result indicating that the processing succeeds to the user terminal, and if the processing of the second service does not time out and the processing fails, reassigning an identifier to the service request.

Step S2236: If the processing of the second service times out, immediately reprocessing the second service.

Step S2237: If the reprocessing of the second service does not time out and the processing succeeds, acquiring a result indicating that the processing succeeds, sending acquired result data indicating that the processing succeeds to the user terminal, and if the reprocessing of the second service does not time out and the processing fails, reassigning an identifier to the service request and marking the processing state of the service request as the second processing state.

Reference can be specifically made to step S213 to step S218 for step S2235 to step S2237, which are not repeated herein.

Figure 9:
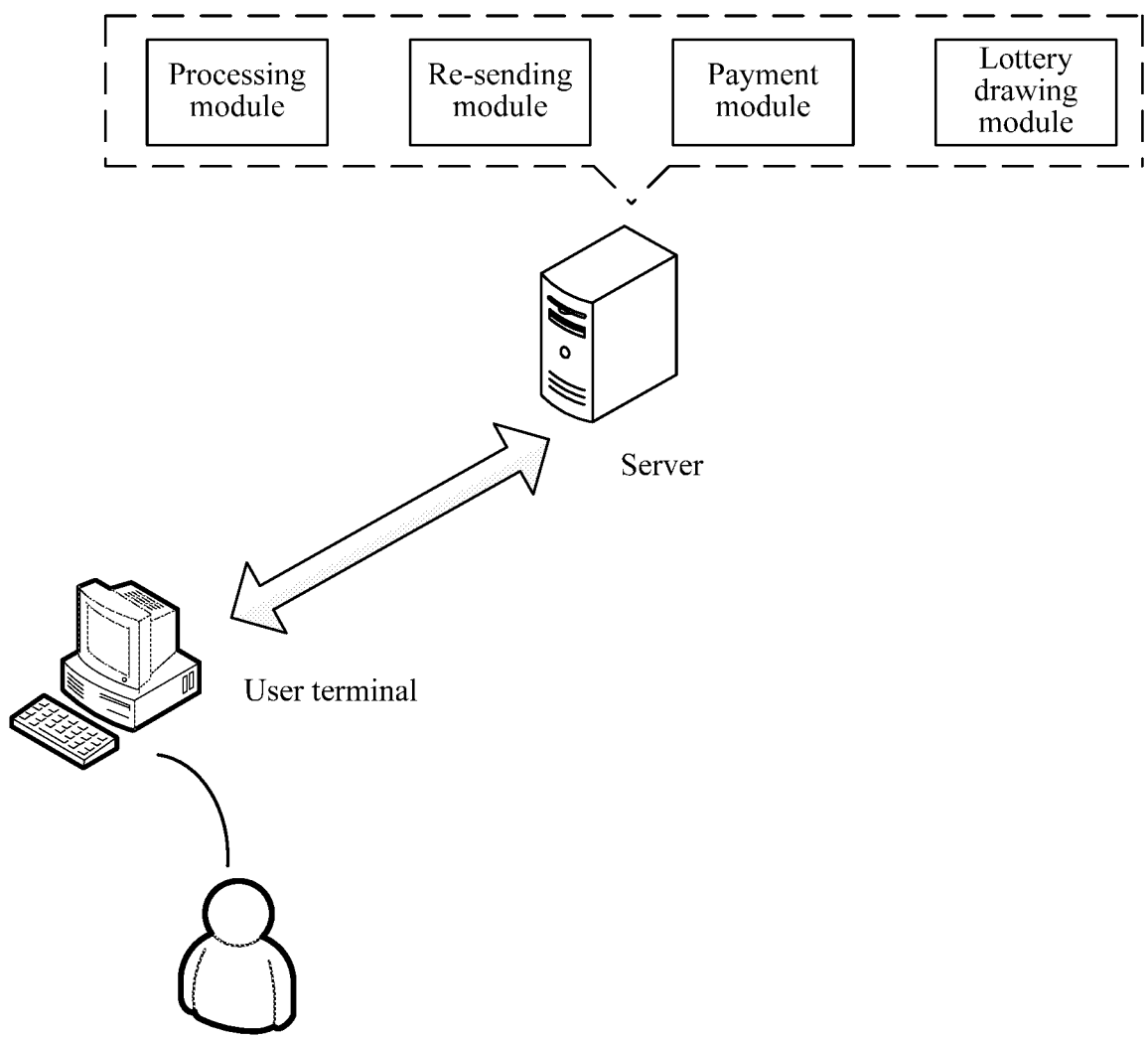
FIG. 9 illustrates an application environment of an example in the method for processing a service request according to the second embodiment of the present invention.

To further describe the method for processing a service request according to this embodiment, examples are provided below with reference to FIG. 9. As shown in FIG. 9, a system for processing a service request is configured in a server. The system for processing a service request may specifically include: a processing module, a re-sending module, a payment module, and a lottery drawing module.

Figure 10:
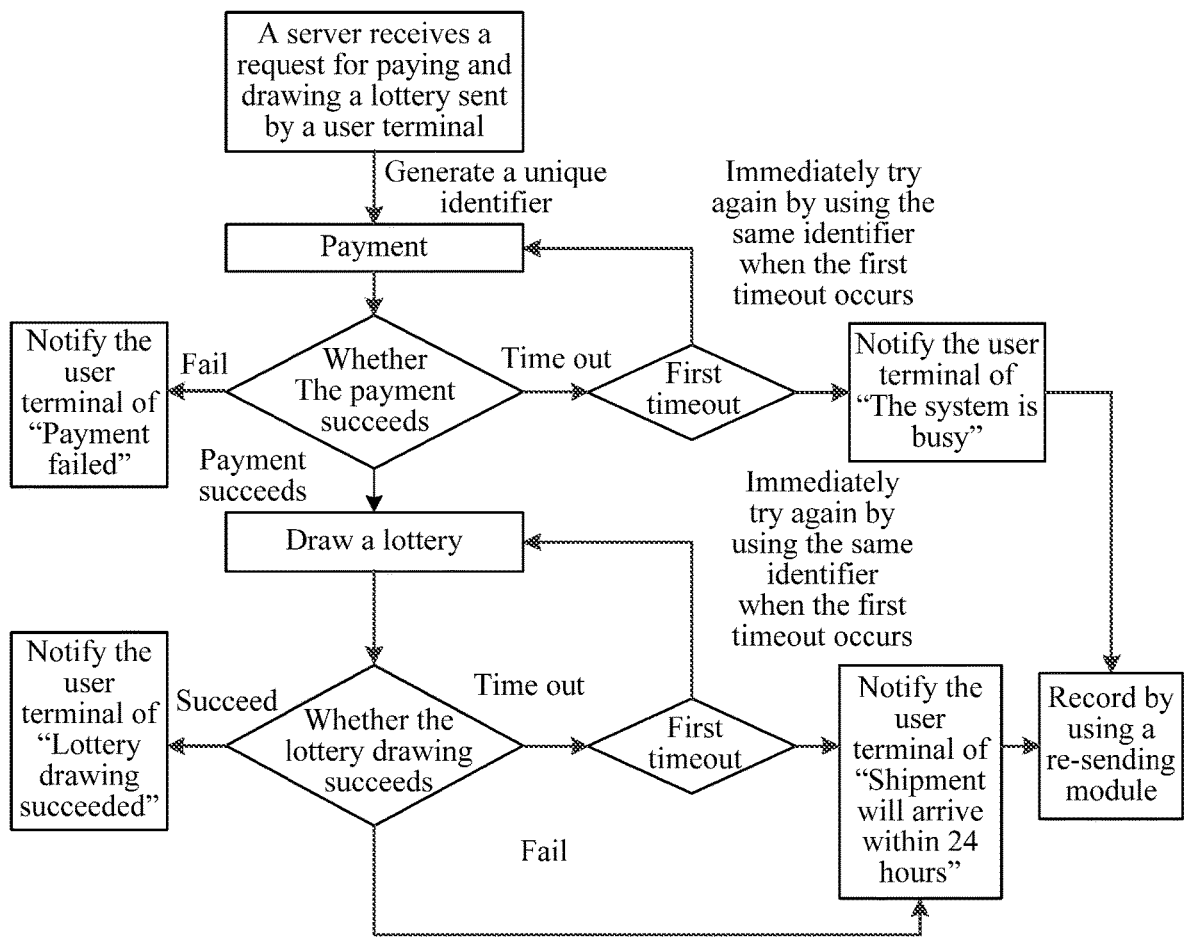
FIG. 10 is a first schematic diagram of the example in the method for processing a service request according to the second embodiment of the present invention.

Referring to FIG. 10, the user terminal may send a request for paying and drawing a lottery containing information such as a bank account and a payment password of a user to the server in response to an operation of paying and drawing a lottery of the user. After receiving the request for paying and drawing a lottery sent by the user terminal, the server, in a first step, generates a unique identifier (a request serial number) for the request for paying and drawing a lottery; in a second step, calls a payment interface according to the bank account and the payment password by using the processing module, processes an electronic payment service for the user terminal by using the payment module, if the payment times out, immediately reprocesses the electronic payment service by using the payment module with the same identifier when the first payment times out, if timeout occurs again, sends a notification to the user terminal so as to notify the user of "The system is busy. Please try again later. Shipment will be confirmed within 24 hours" by using the user terminal and, at the same time, marks the processing state of the request for paying and drawing a lottery as "Payment timed out" and records the request for paying and drawing a lottery and the corresponding identifier and processing state by using the re-sending module, and if the payment fails, sends a notification to the user terminal so as to notify the user of "The payment failed. Please try again later"; and in a third step, if the payment succeeds, calls a lottery drawing interface by using the processing module, processes a lottery drawing service for the user terminal by using the lottery drawing module, if the lottery drawing succeeds, sends a lottery drawing result to the user terminal so as to notify the user of "The payment and lottery drawing succeeds. And drawn game props" by using the user terminal, if the lottery drawing times out, immediately reprocesses the lottery drawing service by using the lottery drawing module again with the same identifier when the first lottery drawing times out, if timeout occurs again, sends a notification to the user terminal so as to notify the user of "Shipment will arrive within 24 hours" by using the user terminal and at the same time marks the processing state of the request for paying and drawing a lottery as "Lottery drawing timed out" and records the request for paying and drawing a lottery and the corresponding identifier and processing state by using the re-sending module, and if the lottery drawing fails, sends a notification to the user terminal so as to notify the user of "Shipment will arrive within 24 hours" by using the user terminal and at the same time marks the processing state of the request for paying and drawing a lottery as "Lottery drawing failed" and records the request for paying and drawing a lottery and the corresponding identifier and processing state by using the re-sending module.

Figure 11:
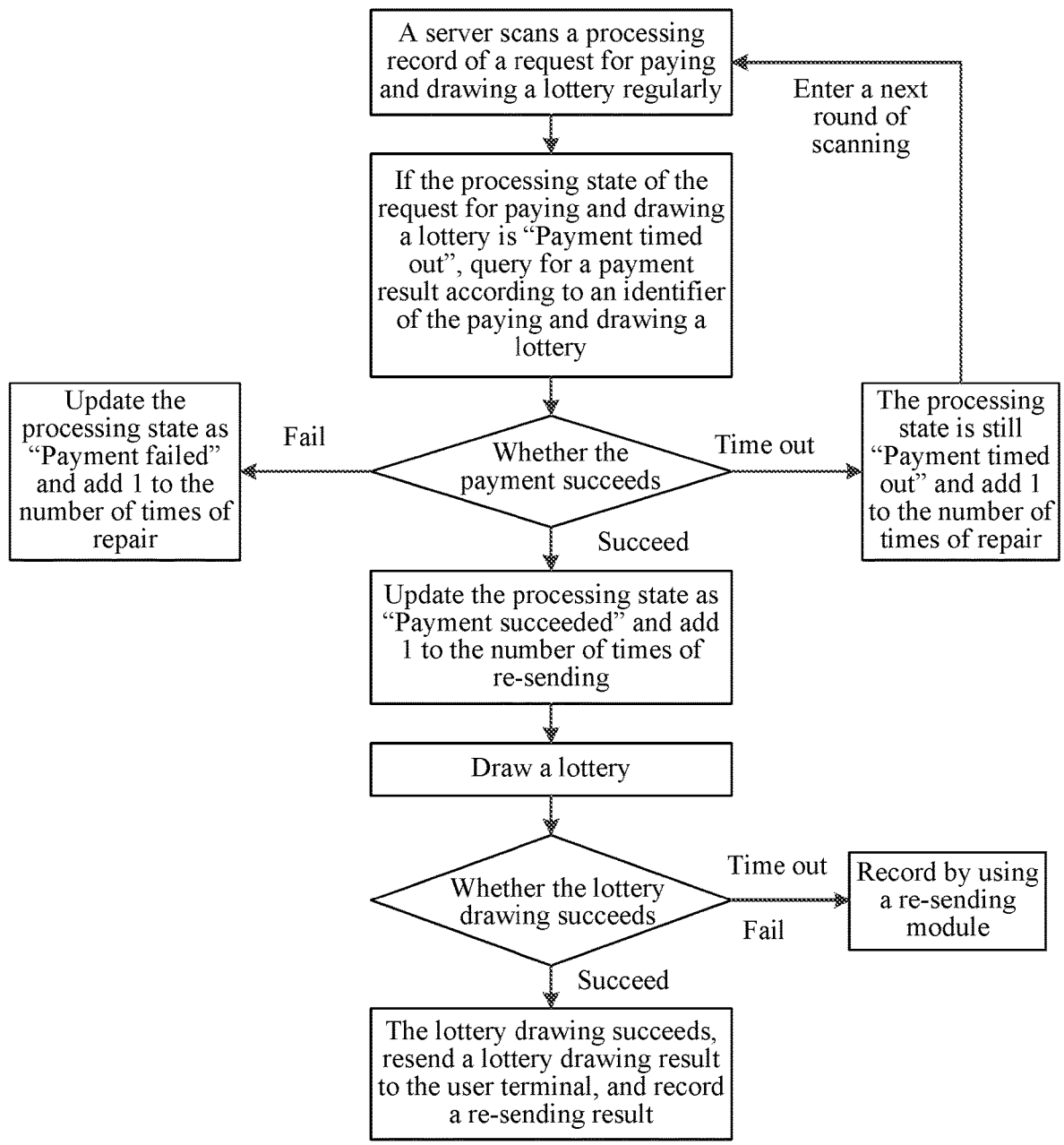
FIG. 11 is a second schematic diagram of the example in the method for processing a service request according to the second embodiment of the present invention.

The server scans the processing record of the request for paying and drawing a lottery by using the re-sending module periodically. If the processing state of the request for paying and drawing a lottery is "Payment timed out", referring to FIG. 11, the server queries for a payment result (the payment module records the processing result of the electronic payment service that specifically includes: payment succeeded, payment failed, and payment timed out) according to the identifier of the request for paying and drawing a lottery. If the payment fails, the server updates the processing state of the request for paying and drawing a lottery as "Payment failed" and records the number of times of repair plus 1. If the payment times out, the server does not modify the processing state, records the number of times of repair plus 1, and waits to enter a next round of scanning. If the payment succeeds, the server updates the processing state as "Payment succeeded", records the number of times of re-sending plus 1, and processes the lottery drawing service by using the lottery drawing module. When the lottery drawing succeeds, the server re-sends a lottery drawing result to the user terminal, updates the processing state of the request for paying and drawing a lottery as "Lottery drawing succeeded" and at the same time records a re-sending result. When the lottery drawing fails or the lottery drawing times out, the server accordingly updates the processing state of the request for paying and drawing a lottery as "Lottery drawing failed" or "Lottery drawing timed out" and records the request for paying and drawing a lottery and the corresponding identifier and processing state by using the re-sending module.

Figure 12:
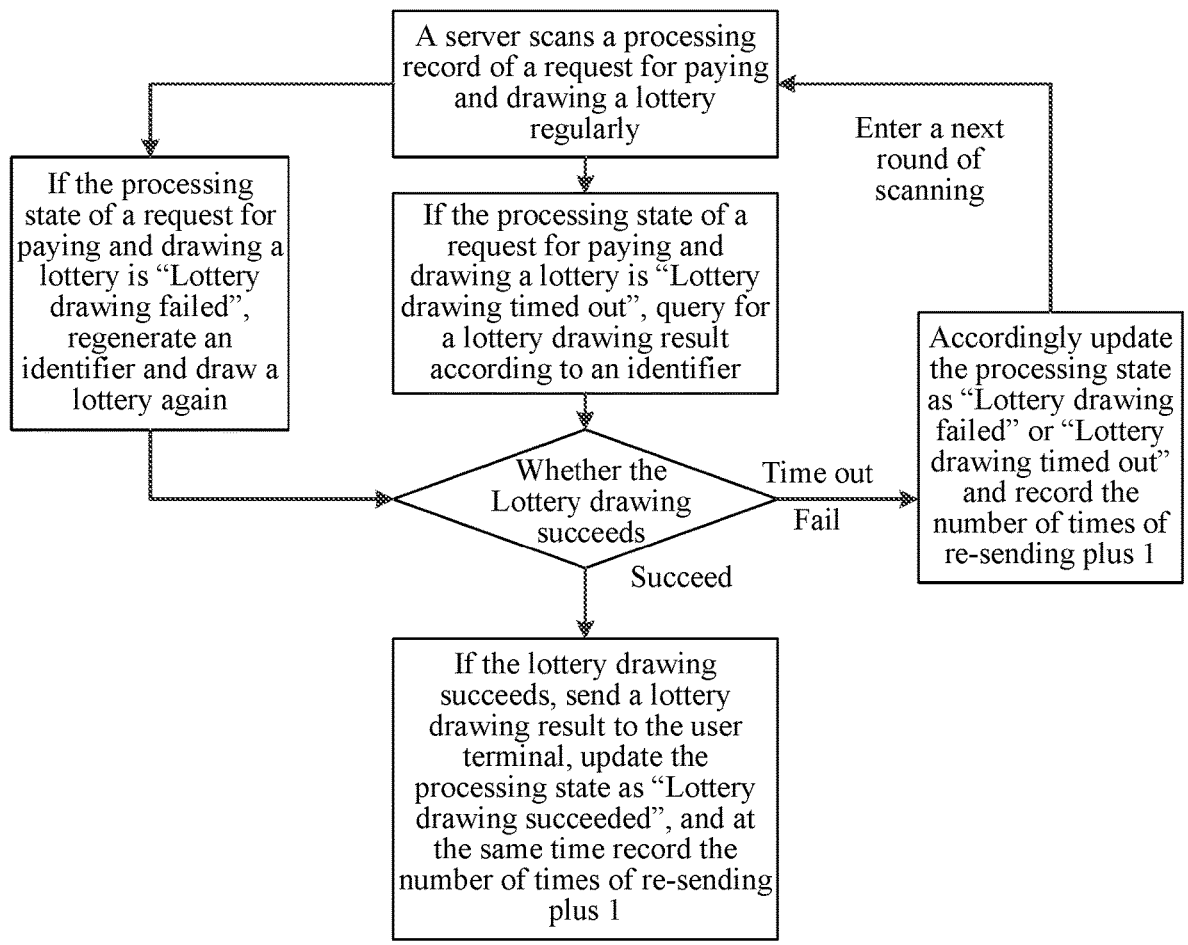
FIG. 12 is a third schematic diagram of the example in the method for processing a service request according to the second embodiment of the present invention.

If the processing state of the request for paying and drawing a lottery is "Lottery drawing timed out" or "Lottery drawing failed", referring to FIG. 12, when the processing state of the request for paying and drawing a lottery is "Lottery drawing timed out", the server queries for a lottery drawing result (the lottery drawing module records the processing result of the lottery drawing service that specifically includes: lottery drawing succeeded, lottery drawing failed, and lottery drawing timed out) according to the identifier of the request for paying and drawing a lottery. If the lottery drawing succeeds, the server re-sends the lottery drawing result to the user terminal, updates the processing state of the request for paying and drawing a lottery as "Lottery drawing succeeded", and at the same time records the number of times of re-sending plus 1. If the lottery drawing fails or if the lottery drawing times out, the server accordingly updates the processing state of the request for paying and drawing a lottery as "Lottery drawing failed" or "Lottery drawing timed out", records the number of times of re-sending plus 1, and waits to enter a next round of scanning. When the processing state of the request for paying and drawing a lottery is "Lottery drawing failed", the server regenerates a unique identifier for the request for paying and drawing a lottery and again processes the lottery drawing service by using the lottery drawing module. If the lottery drawing succeeds, the server re-sends the lottery drawing result to the user terminal, updates the processing state of the request for paying and drawing a lottery as "Lottery drawing succeeded", and at the same time records a re-sending result. If the lottery drawing fails or if the lottery drawing times out, the server accordingly updates the processing state of the request for paying and drawing a lottery as "Lottery drawing failed" or "Lottery drawing timed out", records the number of times of re-sending plus 1, and waits to enter a next round of scanning.

According to the method for processing a service request provided in the embodiment of the present invention, the server assigns a unique identifier to a received service request sent by the user terminal, processes a first service and a second service based on a predetermined sequence according to the service request, marks processing states of the first service and the second service according to processing situations, respectively, queries for the processing state of the service request according to the identifier regularly, acquires a processing result of the service request, when the processing state of the service request is a first processing state and a first processing result is that the processing succeeds, continuously processes the second service, acquires a second processing result, sends the second processing result to the user terminal, and determines whether the second processing result of the service request of which the processing state is the second processing state is acquired, if the second processing result is acquired and the second processing result is successful, sends the second processing result to the user terminal, if the second processing result is acquired and the second processing result is unsuccessful, reassigns an identifier to the service request, and if the second processing result is not acquired, reprocesses the second service, acquires the second processing result, and sends the second processing result to the user terminal; the processing state and the processing result of the service request are queried for by using the identifier and an identifier is reassigned to the service request when it is queried that the second processing result is unsuccessful, which thus can avoid that the server repeatedly processes service requests having the same identifier, improves processing efficiency and avoids a waste of resources.

Third Embodiment

Figure 13:
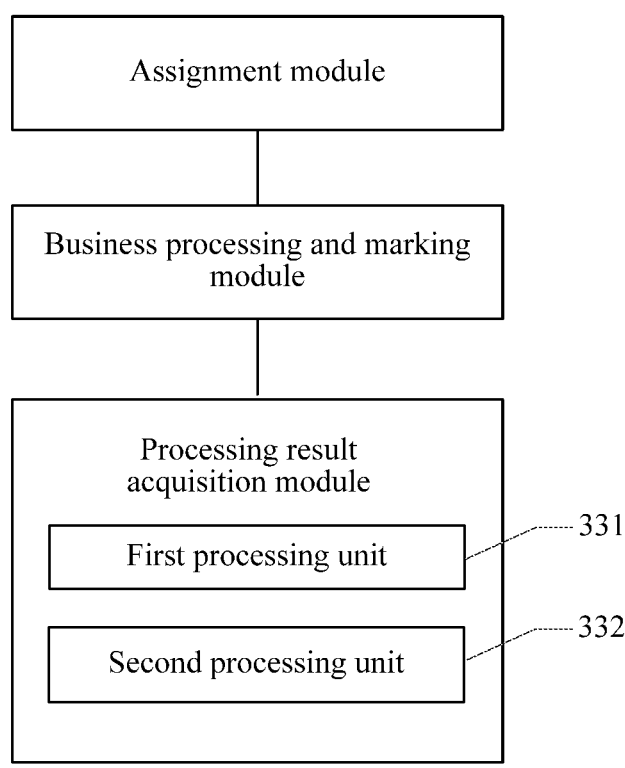
FIG. 13 is a schematic structural diagram of a device for processing a service request according to a third embodiment of the present invention.

FIG. 13 is a schematic structural diagram of a device for processing a service request according to a third embodiment of the present invention. The device for processing a service request according to this embodiment can be used in the method for processing a service request in the foregoing embodiments. As shown in FIG. 13, the device 30 for processing a service request includes: an assignment module 31, a service processing and marking module 32, and a processing result acquisition module 33. The processing result acquisition module 33 may include a first processing unit 331 and a second processing unit 332.

The assignment module 31 is configured to receive a service request sent by a user terminal and assign a unique identifier to the service request, where the service request is used for acquiring preset first and second services and a processing order of the first service is prior to that of the second service.

The service processing and marking module 32 is configured to: process the first service, if the processing times out, mark a processing state of the service request as a first processing state, if the processing does not time out and the processing succeeds, continuously process the second service, and if the processing of the second service times out, mark the processing state of the service request as a second processing state.

The processing result acquisition module 33 is configured to query for the processing state of the service request according to the identifier regularly, acquire a processing result of the service request, and send the processing result to the user terminal, the processing result including: a first processing result corresponding to the first service and a second processing result corresponding to the second service, where when it is queried that the second processing result is unsuccessful, an identifier is reassigned to the service request.

The first processing unit 331 is configured to: when the processing state of the service request is the first processing state and the first processing result is that the processing succeeds, continuously process the second service, acquire the second processing result, and send the second processing result to the user terminal.

The second processing unit 332 is configured to: determine whether the second processing result of the service request of which the processing state is the second processing state is acquired, if the second processing result is acquired and the second processing result is successful, send the second processing result to the user terminal, if the second processing result is acquired and the second processing result is unsuccessful, reassign an identifier to the service request, and if the second processing result is not acquired, reprocess the second service, acquire the second processing result, and send the second processing result to the user terminal.

Reference can be made to the specific content described in the embodiments shown in FIG. 1 to FIG. 12 for the specific process of implementing the respective functions of the functional modules of the device for processing a service request 30 in this embodiment, which is not repeated herein.

According to the device for processing a service request provided in the embodiment of the present invention, the server assigns a unique identifier to a received service request sent by the user terminal, processes a first service and a second service based on a predetermined sequence according to the service request, marks processing states of the first service and the second service according to processing situations, respectively, queries for the processing state of the service request according to the identifier regularly, acquires a processing result of the service request, and when it is queried that a second processing result corresponding to the second service is unsuccessful, reassigns an identifier to the service request, which thus can avoid that the server repeatedly processes service requests having the same identifier, improves processing efficiency and avoids a waste of resources.

Fourth Embodiment

Figure 14:
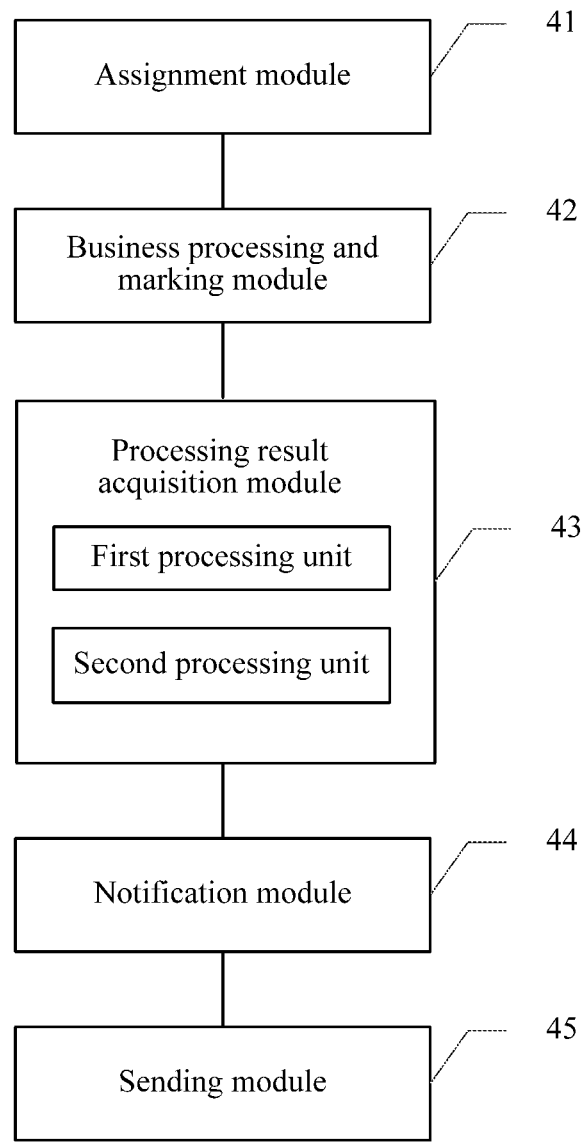
FIG. 14 is a schematic structural diagram of a device for processing a service request according to a fourth embodiment of the present invention.

FIG. 14 is a schematic structural diagram of a device for processing a service request according to a fourth embodiment of the present invention. The device for processing a service request according to this embodiment can be used in the method for processing a service request in the foregoing embodiments. As shown in FIG. 14, the device 40 for processing a service request includes: an assignment module 41, a service processing and marking module 42, a processing result acquisition module 43, a notification module 44, and a sending module 45. The processing result acquisition module 43 includes: a first processing unit 431 and a second processing unit 432.

The assignment module 41 is configured to receive a service request sent by a user terminal and assign a unique identifier to the service request, where the service request is used for acquiring preset first and second services and a processing order of the first service is prior to that of the second service.

Figure 15:
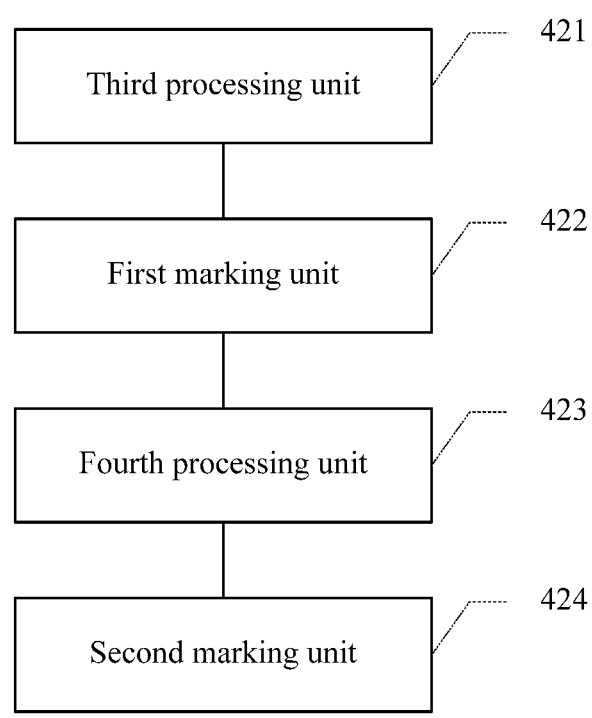
FIG. 15 is a schematic structural diagram of some modules in the device for processing a service request according to the fourth embodiment of the present invention.

The service processing and marking module 42 is configured to: process the first service, if the processing times out, mark a processing state of the service request as a first processing state, if the processing does not time out and the processing succeeds, continuously process the second service, and if the processing of the second service times out, mark the processing state of the service request as a second processing state. As shown in FIG. 15, the service processing and marking module 42 includes: a third processing unit 421, a first marking unit 422, a fourth processing unit 423, and a second marking unit 424. The third processing unit 421 is configured to process the first service and, if the processing times out, immediately reprocess the first service; the first marking unit 422 is configured to: if the processing times out again, mark the processing state of the service request as the first processing state; the fourth processing unit 423 is configured to: if the processing of the second service times out, immediately reprocess the second service; and the second marking unit 424 is configured to: if the processing times out again, mark the processing state of the service request as the second processing state.

The processing result acquisition module 43 is configured to query for a processing state of the service request according to the identifier regularly and acquire a processing result of the service request, where the processing result includes: a first processing result corresponding to the first service and a second processing result corresponding to the second service.

Figure 16:
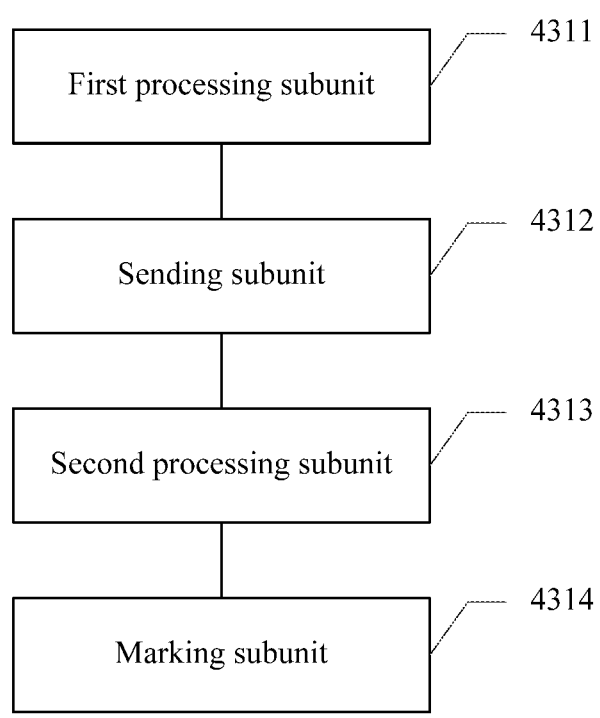
FIG. 16 is a schematic structural diagram of some modules in the device for processing a service request according to the fourth embodiment of the present invention.

The first processing unit 431 is configured to: when the processing state of the service request is the first processing state and the first processing result is that the processing succeeds, continuously process the second service, acquire the second processing result, and send the second processing result to the user terminal. As shown in FIG. 16, the first processing unit 431 includes: a first processing subunit 4311, a sending subunit 4312, a second processing subunit 4313, and a marking subunit 4314. The first processing subunit 4311 is configured to: when the processing state of the service request is the first processing state and the first processing result is that the processing succeeds, continuously process the second service; the sending subunit 4312 is configured to: if the processing of the second service does not time out and the processing succeeds, send a result indicating that the processing succeeds to the user terminal; the second processing subunit 4313 is configured to: if the processing times out, immediately reprocess the second service; and the marking subunit 4314 is configured to: if the processing times out again, mark the processing state of the service request as the second processing state.

The second processing unit 432 is configured to: determine whether the second processing result of the service request of which the processing state is the second processing state is acquired, if the second processing result is acquired and the second processing result is successful, send the second processing result to the user terminal, if the second processing result is acquired and the second processing result is unsuccessful, reassign an identifier to the service request, and if the second processing result is not acquired, reprocess the second service, acquire the second processing result, and send the second processing result to the user terminal.

The notification module 44 is configured to: if the processing of the first service does not time out and the processing fails, notify the user terminal that the processing of the first service fails.

The sending module 45 is configured to: if the processing of the second service does not time out and the processing succeeds, send a result indicating that the processing succeeds to the user terminal.

Preferably, the identifier includes: a service code and processing time corresponding to the service request, a user account corresponding to the user terminal, and a preset number of random characters.

Reference can be made to the specific content described in the embodiments shown in FIG. 1 to FIG. 12 for the specific process of implementing the respective functions of the functional modules of the device for processing a service request 40 in this embodiment, which is not repeated herein.

According to the device for processing a service request provided in the embodiment of the present invention, the server assigns a unique identifier to a received service request sent by the user terminal, processes a first service and a second service based on a predetermined sequence according to the service request, marks processing states of the first service and the second service according to processing situations, respectively, queries for the processing state of the service request according to the identifier regularly, acquires a processing result of the service request, when the processing state of the service request is a first processing state and a first processing result is that the processing succeeds, continuously processes the second service, acquires a second processing result, sends the second processing result to the user terminal, and determines whether the second processing result of the service request of which the processing state is the second processing state is acquired, if the second processing result is acquired and the second processing result is successful, sends the second processing result to the user terminal, if the second processing result is acquired and the second processing result is unsuccessful, reassigns an identifier to the service request, and if the second processing result is not acquired, reprocesses the second service, acquires the second processing result, and sends the second processing result to the user terminal; the processing state and the processing result of the service request are queried for by using the identifier and an identifier is reassigned to the service request when it is queried that the second processing result is unsuccessful, which thus can avoid that the server repeatedly processes service requests having the same identifier, improves processing efficiency and avoids a waste of resources.

Figure 17:
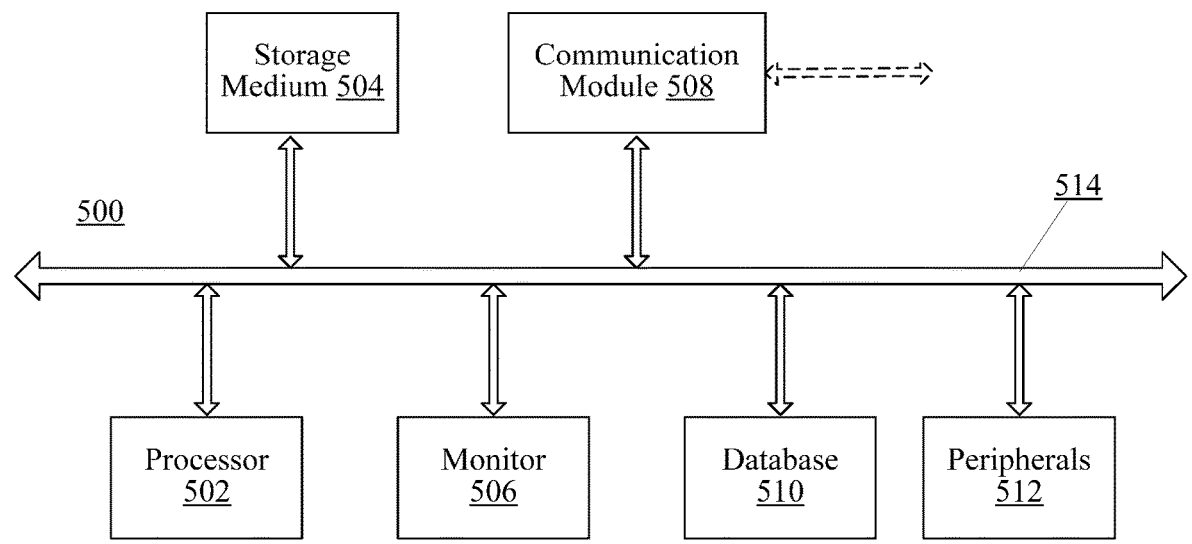
FIG. 17 illustrates an exemplary computing system.

The above described server, user terminal, and/or various modules and units may be implemented using one or more computing systems. FIG. 17 illustrates an exemplary computing system.

As shown in FIG. 17, a computing system 500 may include a processor 502, a storage medium 504, a monitor 506, a communication module 508, a database 510, peripherals 512, and one or more bus 514 to couple the devices together. Certain devices may be omitted and other devices may be included.

The processor 502 can include any appropriate processor or processors. Further, the processor 502 can include multiple cores for multi-thread or parallel processing. The storage medium 504 may include memory modules, e.g., Read-Only Memory (ROM), Random Access Memory (RAM), and flash memory modules, and mass storages, e.g., CD-ROM, U-disk, removable hard disk, etc. The storage medium 504 may store computer programs for implementing various processes (e.g., sending service requests, processing service requests, marking processing state of services, recording processing results, etc.), when executed by the processor 502.

The monitor 506 may include display devices for displaying contents in the computing system 500, e.g. displaying, on a user interface of an application installed on a user terminal, a processing result received from the server in response to a previously sent service request. The peripherals 512 may include I/O devices, e.g., touchscreen, keyboard and mouse for inputting information by a user. The peripherals may also include certain sensors, such as gravity sensors, acceleration sensors, and other types of sensors.

Further, the communication module 508 may include network devices for establishing connections through a communication network such as Internet or other types of computer networks or telecommunication networks, either wired or wireless. The database 510 may include one or more databases for storing certain data and for performing certain operations on the stored data.

In operation, the user terminal and the server may implement certain online services, such as processing electronic payments, performing an online lottery, etc. The server and the user terminal may be configured to provide structures and functions correspondingly for related actions and operations. More particularly, for example, the server may receive a service request sent by the user terminal, process the service request, and return a processing result to the user terminal. The user terminal may include a user interface to facilitate the user to send the service request and present the processing result.

It should be noted that, the embodiments in the specification are described in a progressive manner, each embodiment focuses on describing differences between the embodiment and other embodiments, and mutual reference can be made to the same or similar parts between the embodiments. For apparatus embodiments, the description is relatively simple as it is basically similar to the process embodiments; please refer to the description of the process embodiment for related content.

It should be noted that, herein, the relational terms such as first and second are merely used to distinguish one entity or operation from another entity or operation, but may not necessarily require or imply that the entities or operations have any such an actual relation or order therebetween. Moreover, the terms "include/comprise" and "contain" or any other variations intend to cover non-exclusive inclusion, so that processes, methods, articles or apparatuses including a series of elements not only include the elements, but also include other elements not explicitly listed, or also include inherent elements of the processes, methods, articles or apparatuses. In the absence of more limitations, the elements defined by the expression "including one . . . ," do not exclude that the processes, methods, articles or apparatuses including the elements also have other identical elements.

Persons of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk.

The above are merely preferred embodiments of the present invention, and are not intended to make any formal limitations to the present disclosure. The present disclosure has been disclosed as above through preferred embodiments, but is not intended to be limited thereto. Any person skilled in the art may make some variations or modifications by using the technical content disclosed above as equivalent embodiments with equivalent changes without departing from the scope of the technical solution of the present disclosure, however, any simple alterations, equivalent changes and modifications made to the embodiments according to the technical essence of the present disclosure without departing from the content of the technical solution of the present disclosure should still fall within the scope of the technical solution of the present disclosure.

What is claimed is:

1. A method for processing a service request, comprising:
   receiving, by a local server, a service request sent by a user terminal and assigning an identifier to the service request, wherein the service request comprises requesting processing of a first service and processing of a second service, and a processing order of the first service is prior to that of the second service;
   processing the service request, comprising:
      requesting, by the local server, a first cloud server to process the first service, wherein the first cloud server processes the first service and determines a first processing result of the processing of the first service, the first processing result indicating whether the processing of the first service is completed successfully;
      retrieving, by the local server, the first processing result from the first cloud server;
      determining, by the local server, whether the first processing result is retrieved from the first cloud server within a preset processing time corresponding to the service request;
      upon determining the first processing result is not retrieved within the preset processing time, marking, by the local server, a processing state of the service request as a first processing state;
      upon determining the first processing result is retrieved within the preset processing time:
         determining, by the local server, whether the processing of the first service is completed successfully according to the first processing result;
         if the processing of the first service is not completed successfully, notifying, by the local server, the user terminal that the processing of the first service is not completed successfully; and
         if the processing of the first service is completed successfully:
            requesting, by the local server, a second cloud server to process the second service, wherein the second cloud server processes the second service and determines a second processing result of the processing of the second service, the second processing result indicating whether the processing of the second service is completed successfully;
            retrieving, by the local server, the second processing result from the second cloud server;
            determining, by the local server, whether the second processing result is retrieved from the second cloud server within the preset processing time;
            upon determining the second processing result is retrieved within the preset processing time, sending the second processing result to the user terminal; and
            upon determining the second processing result is not retrieved within the preset processing time, marking the processing state of the service request as a second processing state; and
   querying, by the local server, for the processing state of the service request according to the identifier periodically, the processing state of the service request being either the first processing state or the second processing state, comprising:
      responsive to the processing state of the service request being the first processing state:
         querying the first processing result of the processing of the first service;
         responsive to the first processing result indicating the processing of the first service is completed successfully, requesting the second cloud server to process the second service; and
         responsive to the first processing result indicating the processing of the first service is not completed successfully, notifying the user terminal that the processing of the first service is not completed successfully;
      responsive to the processing state of the service request being the second processing state:
         querying the second processing result of the second service;
         responsive to the second processing result indicating the processing of the second service is completed successfully, notifying the user terminal that the processing of the second service is completed successfully; and
         responsive to the second processing result indicating the processing of the second service is not completed successfully, reassigning a new identifier to the service request.

2. The method according to claim 1, wherein after responsive to the processing state of the service request being the second processing state, querying the second processing result of the processing of the second service, the method further comprises:
   upon determining the second processing result not stored:
      reprocessing the second service;
      acquiring a third processing result of the reprocessing of the second service, the third processing result indicating whether the reprocessing of the second service is completed successfully; and
      sending the third processing result to the user terminal.

3. The method according to claim 1, wherein marking the processing state of the service request as the first processing state comprises:
   upon determining the first processing result is not retrieved within the preset processing time, immediately reprocessing the first service;
   determining whether the immediate reprocessing of the first service exceeds the preset processing time;
   upon determining the immediate reprocessing of the first service not exceeding the preset processing time:
      determining whether the immediate reprocessing of the first service is completed successfully;
      if the immediate reprocessing of the first service is completed successfully, processing the second service; and
      if the immediate reprocessing of the first service is not completed successfully, notifying the user terminal that the processing of the first service is not completed successfully;
   upon determining the immediate reprocessing of the first service exceeding the preset processing time again, marking the processing state of the service request as the first processing state.

4. The method according to claim 1, wherein marking the processing state of the service request as the second processing state comprises:
   upon determining the second processing result is not retrieved within the preset processing time, immediately reprocessing the second service;
   determining whether the immediate reprocessing of the second service exceeds the preset processing time;
   upon determining the immediate reprocessing of the second service not exceeding the preset processing time, sending a third processing result of the immediate reprocessing of the second service to the user terminal, the third processing result indicating whether the immediate reprocessing of the second service is completed successfully; and
   upon determining the immediate reprocessing of the second service exceeding the preset processing time again, marking the processing state of the service request as the second processing state.

5. The method according to claim 1, wherein the responsive to the first processing result indicating the processing of the first service is completed successfully, requesting the second cloud server to process the second service comprises:
   determining whether the processing of the second service exceeds the preset processing time;
   upon determining the processing of the second service not exceeding the preset processing time, sending the second processing result to the user terminal;
   upon determining the processing of the second service exceeding the preset processing time:
      immediately reprocessing the second service;
      determining whether the immediate reprocessing of the second service exceeds the preset processing time;
      upon determining the immediate reprocessing of the second service not exceeding the preset processing time, sending a third processing result of the immediate reprocessing of the second service to the user terminal, the third processing result indicating whether the immediate reprocessing of the second service is completed successfully; and
      upon determining the immediate reprocessing of the second service exceeding the preset processing time again, marking the processing state of the service request as the second processing state.

6. The method according to claim 1, wherein the identifier comprises: a service code and the preset processing time corresponding to the service request, a user account corresponding to the user terminal, and a preset number of random characters.

7. A device for processing a service request, run in a server, comprising:
   a memory; and
   a processor coupled to the memory, the memory being stored a plurality of program modules executed by the processor, wherein the processor is configured to:
   receive a service request sent by a user terminal and assign an identifier to the service request, wherein the service request comprises requesting processing of a first service and processing of a second service, and a processing order of the first service is prior to that of the second service;
   process the service request, comprising:
      requesting a first cloud server to process the first service, wherein the first cloud server processes the first service and determines a first processing result of the processing of the first service, the first processing result indicating whether the processing of the first service is completed successfully;
      retrieving the first processing result from the first cloud server;
   determining whether the first processing result is retrieved from the first cloud server within a preset processing time corresponding to the service request;
   upon determining the first processing result is not retrieved within the preset processing time, marking a processing state of the service request as a first processing state;
   upon determining the first processing result is retrieved within the preset processing time:
      determining whether the processing of the first service is completed successfully according to the first processing result;
      if the processing of the first service is not completed successfully, notifying the user terminal that the processing of the first service is not completed successfully; and
      if the processing of the first service is completed successfully:
         requesting a second cloud server to process the second service, wherein the second cloud server processes the second service and determines a second processing result of the processing of the second service, the second processing result indicating whether the processing of the second service is completed successfully;
         retrieving the second processing result from the second cloud server;

determining whether the second processing result is retrieved from the second cloud server within the preset processing time;
    upon determining the second processing result is retrieved within the preset processing time, sending the second processing result to the user terminal; and
    upon determining the second processing result is not retrieved within the preset processing time, marking the processing state of the service request as a second processing state; and
query for the processing state of the service request according to the identifier periodically, the processing state of the service request being either the first processing state or the second processing state, comprising:
    responsive to the processing state of the service request being the first processing state:
        querying the first processing result of the processing of the first service;
        responsive to the first processing result indicating the processing of the first service is completed successfully, processing the second service; and
        responsive to the first processing result indicating the processing of the first service is not completed successfully, notifying the user terminal that the processing of the first service is not completed successfully;
    responsive to the processing state of the service request being the second processing state:
        querying the second processing result of the second service;
        responsive to the second processing result indicating the processing of the second service is completed successfully, notifying the user terminal that the processing of the second service is completed successfully; and
        responsive to the second processing result indicating the processing of the second service is not completed successfully, reassigning a new identifier to the service request.

8. The device according to claim 7, wherein the processor is further configured to:
after responsive to the processing state of the service request being the second processing state, querying the second processing result of the processing of the second service, upon determining the second processing result not stored:
    reprocess the second service;
    acquire a third processing result of the reprocessing of the second service, the third processing result indicating whether the reprocessing of the second service is completed successfully; and
    send the third processing result to the user terminal.

9. The device according to claim 7, wherein the processor is further configured to:
when processing the service request, upon determining the first processing result is not retrieved within the preset processing time, immediately reprocess the first service;
determine whether the immediate reprocessing of the first service exceeds the preset processing time;
upon determining the immediate reprocessing of the first service not exceeding the preset processing time:
    determine whether the immediate reprocessing of the first service is completed successfully;
    if the immediate reprocessing of the first service is completed successfully, process the second service; and
    if the immediate reprocessing of the first service is not completed successfully, notify the user terminal that the processing of the first service is not completed successfully;
upon determining the immediate reprocessing of the first service exceeding the preset processing time again, mark the processing state of the service request as the first processing state.

10. The device according to claim 7, wherein the processor is further configured to:
when processing the service request, upon determining the second processing result is not retrieved within the preset processing time, immediately reprocess the second service;
determine whether the immediate reprocessing of the second service exceeds the preset processing time;
upon determining the immediate reprocessing of the second service not exceeding the preset processing time, send a third processing result of the immediate reprocessing of the second service to the user terminal, the third processing result indicating whether the immediate reprocessing of the second service is completed successfully; and
upon determining the immediate reprocessing of the second service exceeding the preset processing time again, mark the processing state of the service request as the second processing state.

11. The device according to claim 7, wherein the responsive to the first processing result indicating the processing of the first service is completed successfully, requesting the second cloud server to process the second service comprises:
determining whether the processing of the second service exceeds the preset processing time;
upon determining the processing of the second service not exceeding the preset processing time, send the second processing result to the user terminal;
upon determining the processing of the second service the processing exceeding the preset processing time:
    immediately reprocess the second service;
    determining whether the immediate reprocessing of the second service exceeds the preset processing time;
    upon determining the immediate reprocessing of the second service not exceeding the preset processing time, send a third processing result of the immediate reprocessing of the second service to the user terminal, the third processing result indicating whether the immediate reprocessing of the second service is completed successfully; and
    upon determining the immediate reprocessing of the second service exceeding the preset processing time again, mark the processing state of the service request as the second processing state.

12. The method according to claim 1, wherein the first service includes an electronic payment service and the second service includes a lottery service, and the server processes the electronic payment service first and processes the lottery service after the electronic payment service is completed successfully.

13. The device according to claim 7, wherein the first service includes an electronic payment service and the second service includes a lottery service, and the server processes the electronic payment service first and processes the lottery service after the electronic payment service is completed successfully.

14. A non-transitory computer readable storage medium, storing computer instructions that, when being executed by a processor of a server, cause the processor to perform:

receiving a service request sent by a user terminal and assigning an identifier to the service request, wherein the service request comprises requesting processing of a first service and processing of a second service, and a processing order of the first service is prior to that of the second service;

processing the service request, comprising:

requesting a first cloud server to process the first service, wherein the first cloud server processes the first service and determines a first processing result of the processing of the first service, the first processing result indicating whether the processing of the first service is completed successfully;

retrieving the first processing result from the first cloud server;

determining whether the first processing result is retrieved from the first cloud server within a preset processing time corresponding to the service request;

upon determining the first processing result is not retrieved within the preset processing time, marking a processing state of the service request as a first processing state;

upon determining the first processing result is retrieved within the preset processing time:

determining whether the processing of the first service is completed successfully according to the first processing result;

if the processing of the first service is not completed successfully, notifying the user terminal that the processing of the first service is not completed successfully; and if the processing of the first service is completed successfully:

requesting a second cloud server to process the second service, wherein the second cloud server processes the second service and determines a second processing result of the processing of the second service, the second processing result indicating whether the processing of the second service is completed successfully;

retrieving the second processing result from the second cloud server;

determining whether the second processing result is retrieved from the second cloud server within the preset processing time;

upon determining the second processing result is retrieved within the preset processing time, sending the second processing result to the user terminal; and upon determining the second processing result is not retrieved within the preset processing time, marking the processing state of the service request as a second processing state; and querying for the processing state of the service request according to the identifier periodically, the processing state of the service request being either the first processing state or the second processing state, comprising:

responsive to the processing state of the service request being the first processing state:

querying the first processing result of the processing of the first service;

responsive to the first processing result indicating the processing of the first service is completed successfully, processing the second service; and responsive to the first processing result indicating the processing of the first service is not completed successfully, notifying the user terminal that the processing of the first service is not completed successfully;

responsive to the processing state of the service request being the second processing state:

querying the second processing result of the second service;

responsive to the second processing result indicating the processing of the second service is completed successfully, notifying the user terminal that the processing of the second service is completed successfully; and responsive to the second processing result indicating the processing of the second service is not completed successfully, reassigning a new identifier to the service request.

15. The storage medium according to claim 14, wherein after responsive to the processing state of the service request being the second processing state, querying the second processing result of the processing of the second service, the computer instructions further cause the processor to perform:

upon determining the second processing result not stored:

reprocessing the second service;

acquiring a third processing result of the reprocessing of the second service, the third processing result indicating whether the reprocessing of the second service is completed successfully; and sending the third processing result to the user terminal.

16. The storage medium according to claim 14, wherein marking the processing state of the service request as the first processing state comprises:

upon determining the first processing result is not retrieved within the preset processing time, immediately reprocessing the first service;

determining whether the immediate reprocessing of the first service exceeds the preset processing time;

upon determining the immediate reprocessing of the first service not exceeding the preset processing time:

determining whether the immediate reprocessing of the first service is completed successfully;

if the immediate reprocessing of the first service is completed successfully, processing the second service; and if the immediate reprocessing of the first service is not completed successfully, notifying the user terminal that the processing of the first service is not completed successfully;

upon determining the immediate reprocessing of the first service exceeding the preset processing time again, marking the processing state of the service request as the first processing state.

17. The storage medium according to claim 14, wherein marking the processing state of the service request as the second processing state comprises:

upon determining the second processing result is not retrieved within the preset processing time, immediately reprocessing the second service;

determining whether the immediate reprocessing of the second service exceeds the preset processing time;

upon determining the immediate reprocessing of the second service not exceeding the preset processing time, sending a third processing result of the immediate reprocessing of the second service to the user terminal, the third processing result indicating whether the immediate reprocessing of the second service is completed successfully; and
upon determining the immediate reprocessing of the second service exceeding the preset processing time again, marking the processing state of the service request as the second processing state.

18. The storage medium according to claim 14, the responsive to the first processing result indicating the processing of the first service is completed successfully, processing the second service comprises:
determining whether the processing of the second service exceeds the preset processing time;
upon determining the processing of the second service not exceeding the preset processing time, sending the second processing result to the user terminal;
upon determining the processing of the second service exceeding the preset processing time:
immediately reprocessing the second service;
determining whether the immediate reprocessing of the second service exceeds the preset processing time;
upon determining the immediate reprocessing of the second service not exceeding the preset processing time, sending a third processing result of the immediate reprocessing of the second service to the user terminal, the third processing result indicating whether the immediate reprocessing of the second service is completed successfully; and
upon determining the immediate reprocessing of the second service exceeding the preset processing time again, marking the processing state of the service request as the second processing state.

* * * * *